US012768671B2

(12) United States Patent
Chandrasekaran et al.

(10) Patent No.: US 12,768,671 B2
(45) Date of Patent: Oct. 20, 2026

(54) DYNAMIC IMU CALIBRATION AND SENSOR FUSION

(71) Applicant: Rajant Health Inc., Malvern, PA (US)

(72) Inventors: Muthukumaran Chandrasekaran, Malvern, PA (US); Jack Mountney, Malvern, PA (US); Robert Joseph Schena, Malvern, PA (US)

(73) Assignee: Rajant Health Inc., Malvern, PA (US)

( * ) Notice: Subject to any disclaimer, the term of this patent is extended or adjusted under 35 U.S.C. 154(b) by 320 days.

(21) Appl. No.: 18/238,880

(22) Filed: Aug. 28, 2023

(65) Prior Publication Data

US 2024/0068839 A1 Feb. 29, 2024

Related U.S. Application Data

(60) Provisional application No. 63/401,448, filed on Aug. 26, 2022.

(51) Int. Cl.
*G01C 25/00* (2006.01)

(52) U.S. Cl.
CPC .................................. *G01C 25/005* (2013.01)

(58) Field of Classification Search
CPC ...... G01C 25/005; G01C 21/183; G01P 21/00
See application file for complete search history.

(56) References Cited

U.S. PATENT DOCUMENTS

| | | | | |
|---|---|---|---|---|
| 9,891,245 | B2 * | 2/2018 | Anderson | G01P 21/00 |
| 10,054,610 | B2 | 8/2018 | Anderson et al. | |
| 10,989,563 | B2 | 4/2021 | Anderson | |
| 2013/0144550 | A1 * | 6/2013 | Czompo | G01C 25/005 702/104 |
| 2013/0197845 | A1 | 8/2013 | Keal et al. | |
| 2016/0377650 | A1 | 12/2016 | Anderson et al. | |
| 2019/0385339 | A1 | 12/2019 | Zhao et al. | |
| 2020/0088761 | A1 | 3/2020 | Anderson et al. | |
| 2020/0271689 | A1 | 8/2020 | Nichols et al. | |
| 2020/0311514 | A1 * | 10/2020 | Speranzon | G01C 21/16 |

OTHER PUBLICATIONS

International Search Report and the Written Opinion received in corresponding patent application No. PCT/US2023/031187, mail date May 30, 2024.

Supplemental European Search Report for European Application No. 23901264, mailed Jul. 2, 2026, 11 pages.

* cited by examiner

*Primary Examiner* — Jennifer Bahls
(74) *Attorney, Agent, or Firm* — BLANK ROME LLP

(57) ABSTRACT

Disclosed herein are systems and methods for computer-assisted sensor calibration where the computer receives raw accelerometer data, raw gyroscope data, and raw magnetometer data and performs spatial calibration. The calibration data is used to calculate orientation data, and then then calibrated data and calibration data are used to provide corrected linear acceleration data that may be used by sensors to provide more accurate readings, for example, with regard to physiological data. In certain embodiments, in certain embodiments, the sensor calibration further employs a 9-axis IMU ("Inertial Measurement Unit") comprising an accelerometer, gyroscope and magnetometer to provide calibration data.

12 Claims, 8 Drawing Sheets

DYNAMIC IMU CALIBRATION AND SENSOR FUSION

CROSS-REFERENCE TO RELATED APPLICATION

This application claims the benefit of U.S. Prov. App. No. 63/401,448, filed Aug. 26, 2022, the entire contents of which are incorporated herein by reference.

BACKGROUND OF THE INVENTION

The current state of the art is to perform calibration online (i.e. in real time, with some latency) because typically these measurements are used downstream for real-time applications. Given the time-critical nature of some real-time applications, it becomes pointless to calibrate if it is not done so in a timely manner. So, existing calibration algorithms have to be optimized for highly constrained hardware and software limitations. Therefore, existing algorithms trade-off quality for reduced latency. There is interest in receiving highly accurate measurements before it is used offline for training an AI/ML model to make a critical (e.g., a health-related) inference or decision. So, technically, the calibration algorithms have no theoretical limitations on the compute power or latency. One novel aspect of the present invention is to use all of the data needed to effectively back-calibrate the erroneous measurements offline resulting in lower overall cumulative error.

The current state of the art for calibrating the different IMU sensors does not account for dynamically changing bias and sensitivity parameters due to time-varying factors such as temperature and shock. Typically, a factory calibration is performed at the time the device is manufactured and/or a recalibration routine is performed every so often to proactively adjust for the drift or other things that causes the calibration to become void. Instead, one of the novel ideas is to systematically react to inconsistency in the calibration to enable faster recovery from erroneous calibration parameter estimates using some of the techniques discussed in this paragraph. Another novel idea is to use a suboptimal online calibration to provide time-sensitive situational awareness but do an offline correction to provide a more accurate inference at an acceptable later time with relaxed time and compute-power constraints.

The ability to perform back-calibration of sensors impacted by time-varying calibration parameters is also novel and does not currently exist and that deficiency is remedied by the present invention.

SUMMARY OF THE INVENTION

The disclosed embodiments provide a system for sensor calibration. The system receives raw accelerometer data, raw gyroscope data, and raw magnetometer data and performs spatial calibration at an inertial measurement unit (IMU). A plurality of calibration parameters are then output from the inertial measurement unit. Calibrated data from the accelerometer, gyroscope, and magnetometer are transmitted to a sensor fusion module, where the sensor fusion module computes an orientation. The orientation and calibrated accelerometer data are then transmitted to a gravity removal module, where the gravity removal module calculates corrected linear acceleration.

In certain embodiments, there may be eighteen calibration parameters and in others, up to thirty-six calibration parameters.

In other embodiments, the calibration is dynamically performed.

In yet other embodiments, the system further transmits calibrated accelerometer data, calibrated magnetometer data, and calibrated gyroscope data from the sensor fusion module to an AI algorithm module.

In other embodiments, the AI algorithm module is trained to perform an offline correction using the calibrated accelerometer data, calibrated magnetometer data, and calibrated gyroscope data for subsequent iterations

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
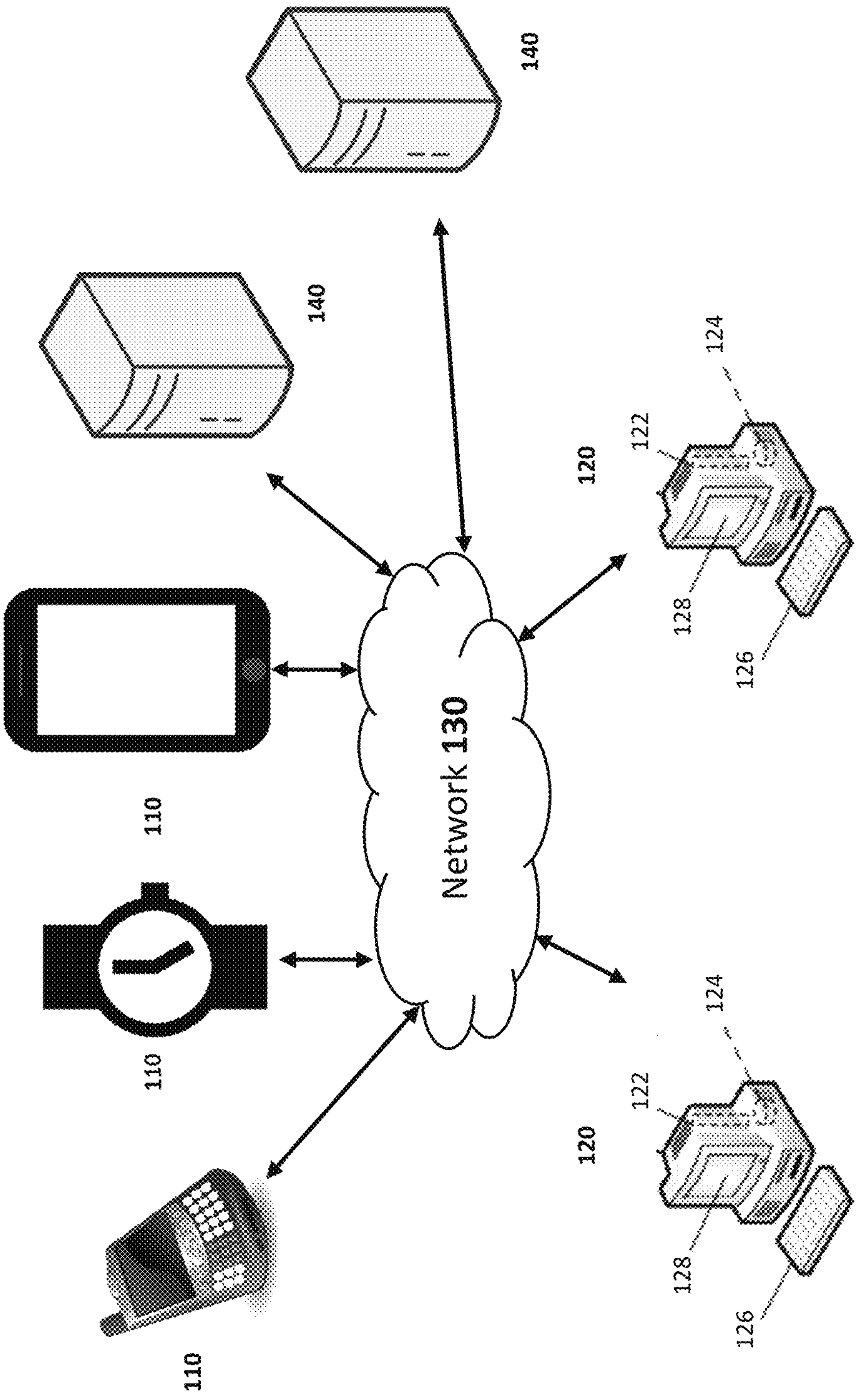
FIG. 1 is a diagram of an exemplary embodiment of the hardware of the system of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

Disclosed herein is a medical-grade wearable device which is comprised of physiological sensors including PPG ("Photoplethysmography"), GSR ("Galvanic Skin Response"), and temperature sensors. In certain embodiments, the device is utilized in conjunction with custom data pipeline and backend to collect physiological data that will be used for training AI/ML models to perform medically relevant diagnostic inferences as well as for patient monitoring. Rajant desires the most accurate and precise physiological sensor data that can be provided by the device. To that end, the device is further equipped with a 9-axis IMU ("Inertial Measurement Unit") comprising one or more accelerometers, gyroscopes, and magnetometers. In certain embodiments, the IMU may also include one or more temperature sensors.

Among other uses, the IMU is used to reduce motion artifacts in the PPG sensor data introduced due to motion by the patient. In particular, the accelerometer data will be utilized to correct the PPG signals by removing motion-induced artifacts. The gravitational component of the acceleration must then be removed from the signal in order to compute the true linear acceleration of the device. That is achieved using a process referred to as sensor fusion, which combines the outputs of the accelerometer, gyroscope and the magnetometer to determine the orientation (and heading) of the device and subtracting the contribution of gravity along each axis. The accelerometer, gyroscope, and magnetometer produce noisy measurements which need to be corrected. Furthermore, the measurements are adversely impacted if the sensors are not calibrated properly. Calibration is an additional correctional step that is performed to offset the error in the raw measurements to account for the bias and sensitivity parameters of the sensors.

In order to perform a calibration online, one common way is to categorize each new data point obtained into groups (i.e. labels) indicating usability of the data point toward calibrating a certain sensor. So, when sufficient data points have been collected, the sensors can then be calibrated. Subsequently, the sensor measurements are then fused to provide a better orientation estimate for the device using one of several estimation methods such as Kalman or Particle filter (or its variants). Better estimates can be provided at a faster rate if the search for potential solutions is focused on solution spaces that are more probable given the estimated trajectory of the device (such as a car that is driving on a road). However, there is interest in applications where the trajectory of the device in question may seem ad hoc (such as human motion). One novel idea is to come up with better and more informative categories/labels for each data point enabled by AI to assist the calibration and sensor fusion. For example, performing activity recognition (i.e. walking, running, etc.) could inform the calibration/fusion procedures about potential trajectories that the device might take, thereby enabling faster and more effective calibration/fusion (both online and offline).

FIG. 1 is an exemplary embodiment of the system of the present invention. In the exemplary system 100, one or more peripheral devices 110 are connected to one or more computers 120 through a network 130. Examples of peripheral devices/locations 110 include smartphones, tablets, wearables devices, and any other electronic devices that collect and transmit data over a network that are known in the art. The network 130 may be a wide-area network, like the Internet, or a local area network, like an intranet. Because of the network 130, the physical location of the peripheral devices 110 and the computers 120 has no effect on the functionality of the hardware and software of the invention. Both implementations are described herein, and unless specified, it is contemplated that the peripheral devices 110 and the computers 120 may be in the same or in different physical locations. Communication between the hardware of the system may be accomplished in numerous known ways, for example using network connectivity components such as a modem or Ethernet adapter. The peripheral devices/locations 110 and the computers 120 will both include or be attached to communication equipment. Communications are contemplated as occurring through industry-standard protocols such as HTTP or HTTPS.

Each computer 120 is comprised of a central processing unit 122, a storage medium 124, a user-input device 126, and a display 128. Examples of computers that may be used are: commercially available personal computers, open source computing devices (e.g. Raspberry Pi), commercially available servers, and commercially available portable devices (e.g. smartphones, smartwatches, tablets). In one embodiment, each of the peripheral devices 110 and each of the computers 120 of the system may have software related to the system installed on it. In such an embodiment, system data may be stored locally on the networked computers 120 or alternately, on one or more remote servers 140 that are accessible to any of the peripheral devices 110 or the networked computers 120 through a network 130. In alternate embodiments, the software runs as an application on the peripheral devices 110, and includes web-based software and iOS-based and Android-based mobile applications.

Online IMU Calibration and Sensor Fusion

Figure 2:
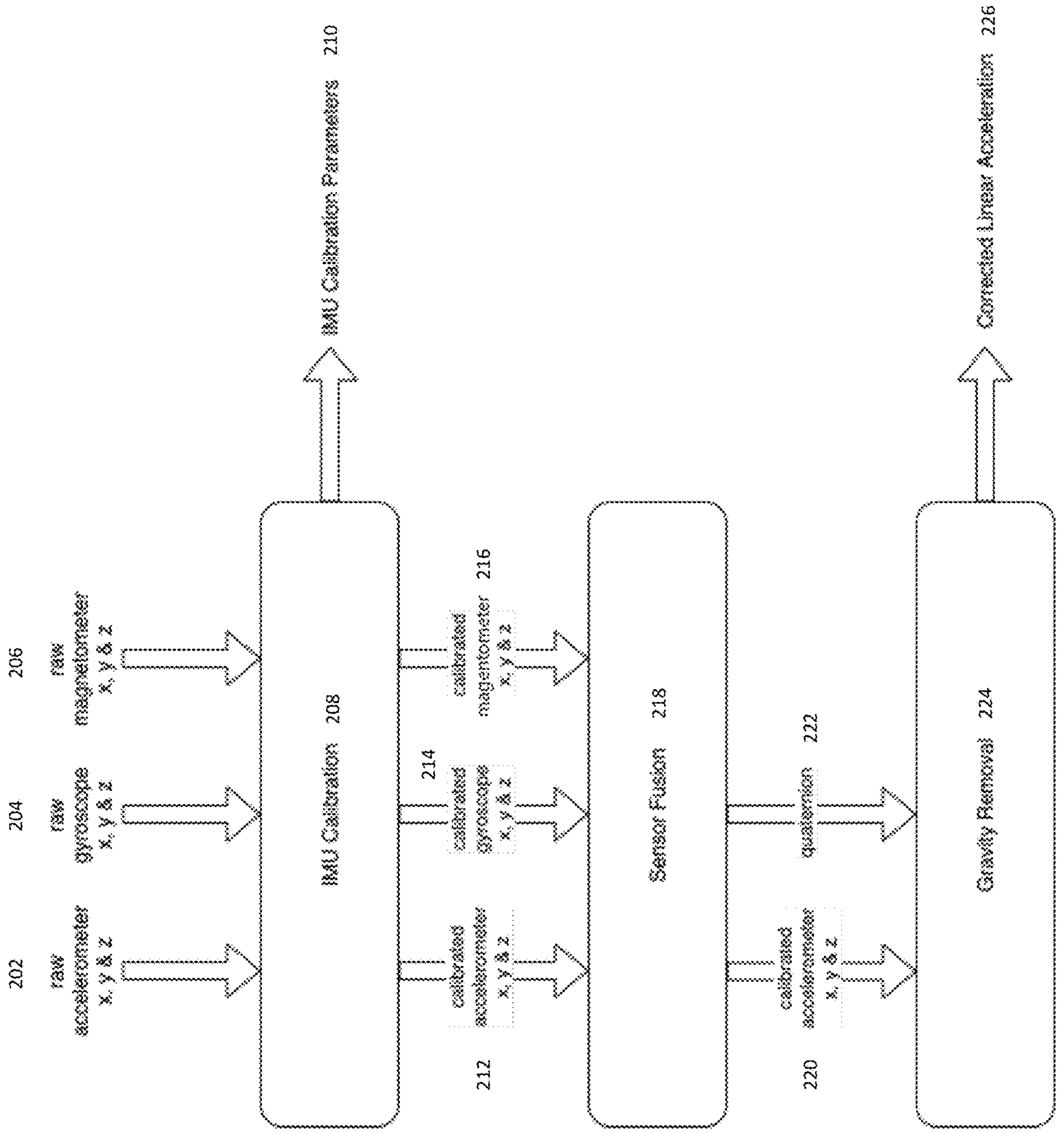
FIG. 2 is a flowchart outlining how the system processes raw IMU data to produce an orientation estimate from an exemplary sensor fusion algorithm that uses online calibration.

Online calibration and sensor fusion utilizes real-time IMU measurements to update the bias and sensitivity parameters of the accelerometer, gyroscope and magnetometer. When an appropriate solution to the parameters has been found, errors introduced by the biases and offsets are significantly reduced. FIG. 2 characterizes the processing that raw IMU data follows to produce an accurate orientation estimate from the sensor fusion algorithm. Bias and sensitivity parameters are estimated for each of the 3 sensors (accelerometer 202, gyroscope 204 & magnetometer 206). IMU calibration is then performed 208 and a total of 18 calibration parameters 210 are preferably estimated (bias and sensitivity for the x, y & z axis of each sensor). Parameters are updated when particular angular velocities and static orientations are measured for the accelerometer 212, the gyroscopes 214 and the magnetometer 216. For example, the IMU rotates by an arc length of 120° and comes to rest at a specific angle relative to gravity.

Sensor Fusion

Sensor fusion 218 utilizes calibrated IMU data to estimate the orientation of the device in world coordinates. Dynamic calibration results in more accurate sensor fusion estimation for time and temperature varying IMU bias and sensitivity parameters than static calibration. Faster recovery is achieved by the sensor fusion with dynamic calibration. Sensor fusion detects inaccuracies in IMU parameter estimates.

Gravity Removal

The quaternion 222 and calibrated accelerometer 220 describing IMU orientation from the sensor fusion algorithm is used to determine acceleration due to gravity that is projected onto the x, y & z axes of the IMU. The gravitational projection is removed 224 from the accelerometer readings to provide linear acceleration estimates 226 in world coordinates.

Figure 3:
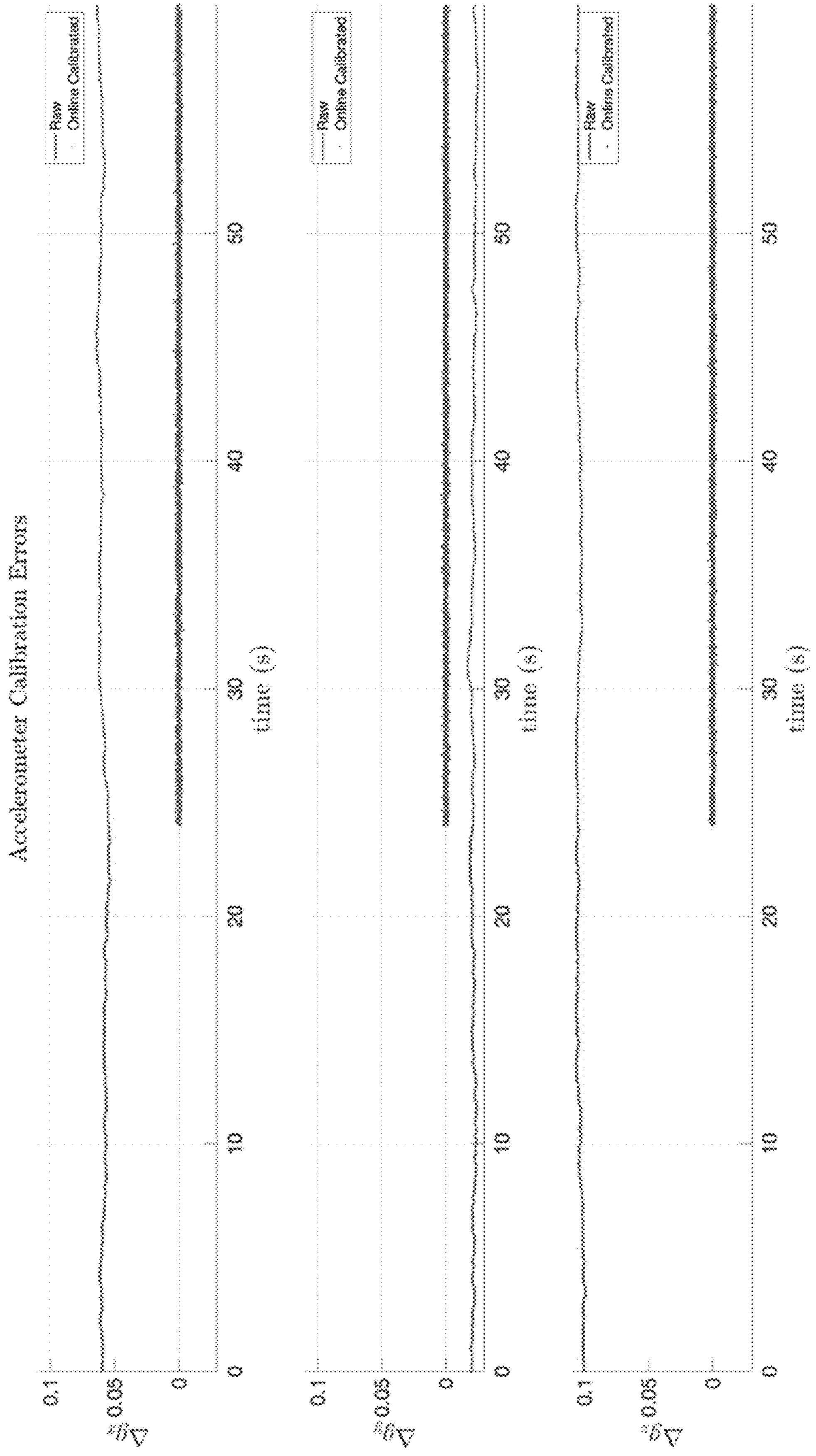
FIG. 3 is a chart showing an evaluation of online calibration for IMU accelerometer bias errors.

FIG. 3 demonstrates the ability of the calibration procedure to estimate IMU parameters. In this simulated example, the accelerometer has static bias offset errors of 0.6, −0.2 & 0.1 milligees on the x, y, & z axes respectively. The calibration goes into effect at approximately 24 seconds. After that point in time, the calibrated accelerometer signals have errors that are less than 10 milligees on each axis, whereas the uncalibrated accelerometer measurements contain errors that are reflective of the biases.

Figure 4:
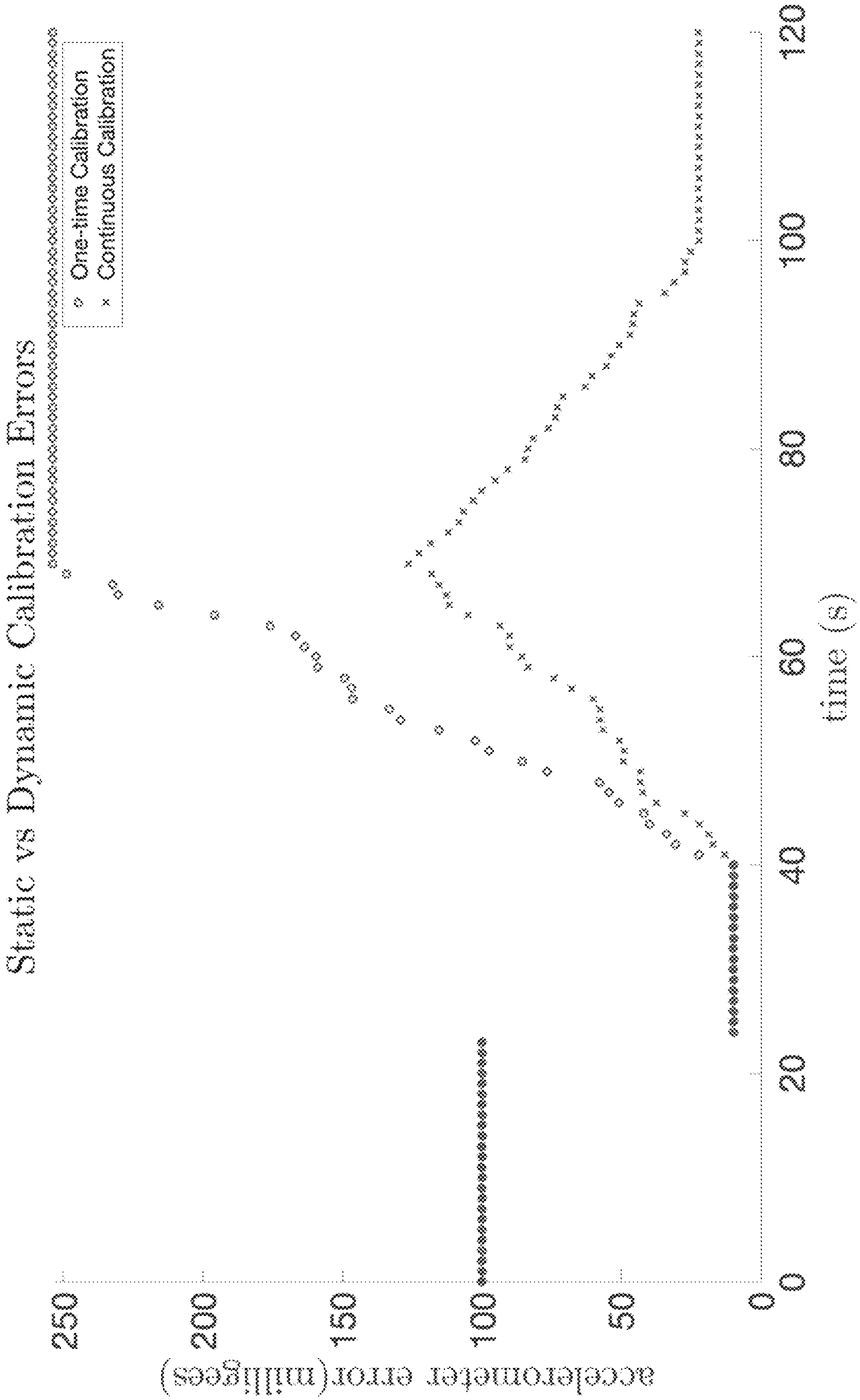
FIG. 4 is a chart showing the advantages of dynamic IMU calibration over static IMU calibration.

FIG. 4 demonstrates the necessity of continuous calibration to ensure accurate IMU calibration. In this simulation, total accelerometer errors are initially 100 milligees. At 24 seconds, it is determined that a set valid calibration parameter has been computed and the accelerometer errors drop to 10 milligees. At the 40 second time position, the IMU parameters change. This can be due to temperature change or mechanical shock (or other phenomena). If calibration is only executed once and IMU parameters change at some instance in the future, the change in parameters is likely to produce orientation estimates that are out of tolerance. Conversely, continuous calibration is able to recover from IMU parameter dynamics.

Offline IMU Calibration and Sensor Fusion

Real time IMU calibration makes use of historical data only to update bias and sensitivity parameters. However, given a set of recorded raw IMU data, offline calibration can be executed to possibly achieve more accurate IMU parameters. At any point in time, past and future IMU samples can be used to determine the optimal set of bias and sensitivity estimates. Just as in the online application, offline calibration is capable of tracking dynamic IMU parameters that are time and temperature varying.

Figure 5:
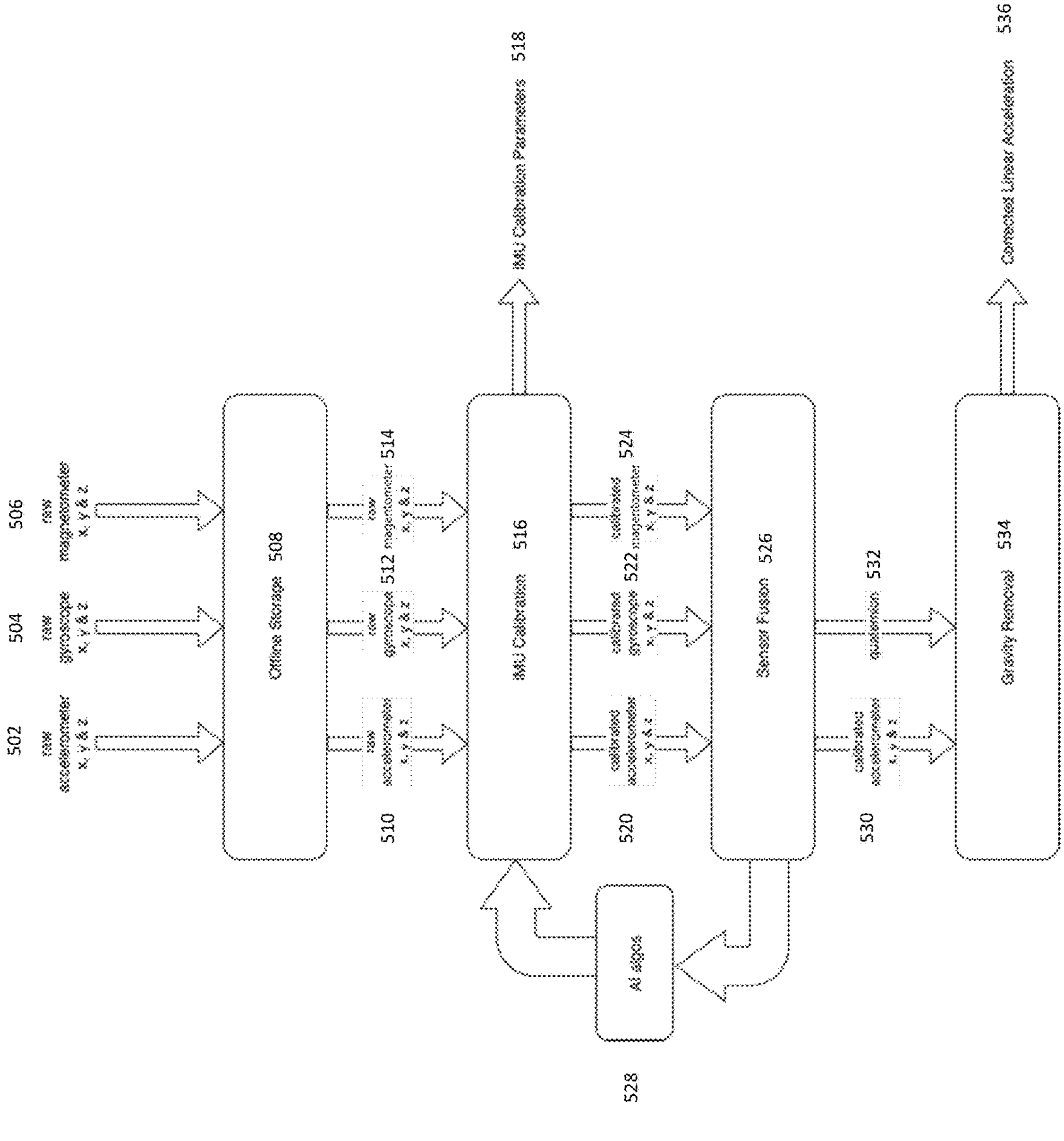
FIG. 5 is a flowchart outlining how the system processes raw IMU data to produce an orientation estimate from an exemplary sensor fusion algorithm that uses offline calibration.

Offline calibration takes advantage of large data sets by leveraging machine learning (ML) and artificial intelligence (AI) algorithms. The AI algorithms predict when calibration parameters are out of tolerance and also quantify the quality of calibration measurements. FIG. 5 characterizes the processing that raw IMU data follows to produce an accurate orientation estimate from the sensor fusion algorithm.

Offline Storage

Data can be stored locally to an IMU device, smartphone, edge processing nodes, etc. until ready for processing. Offline processing can occur on a backend machine or at remote nodes.

As shown in FIG. 5, bias and sensitivity parameters are estimated for each of the 3 sensors (accelerometer 502, gyroscope 504 & magnetometer 506) and sent to offline storage 508. From the offline storage 508, the readings from the sensor 502, 504, 506 are used to perform IMU calibration 516 and a total of 18 calibration parameters 518 are preferably estimated (bias and sensitivity for the x, y & z axis of each sensor), using raw acceleration data 510, raw gyroscope data 512, and raw magnetometer data 514. In certain embodiments, there may be up to 36 calibration parameters. Parameters are updated when particular angular velocities and static orientations are measured for the calibrated accelerometer 520, the calibrated gyroscope 522, and the calibrated magnetometer 524. For example, the IMU rotates by an arc length of 120° and comes to rest at a specific angle relative to gravity.

Sensor Fusion

Sensor fusion 526 utilizes calibrated IMU data to estimate the orientation of the device in real world coordinates. Dynamic calibration results in a more accurate sensor fusion estimation for time and temperature varying IMU bias and sensitivity parameters than static calibration. Faster recovery is achieved by the sensor fusion with dynamic calibration. Sensor fusion detects inaccuracies in IMU parameter estimates.

Figure 6:
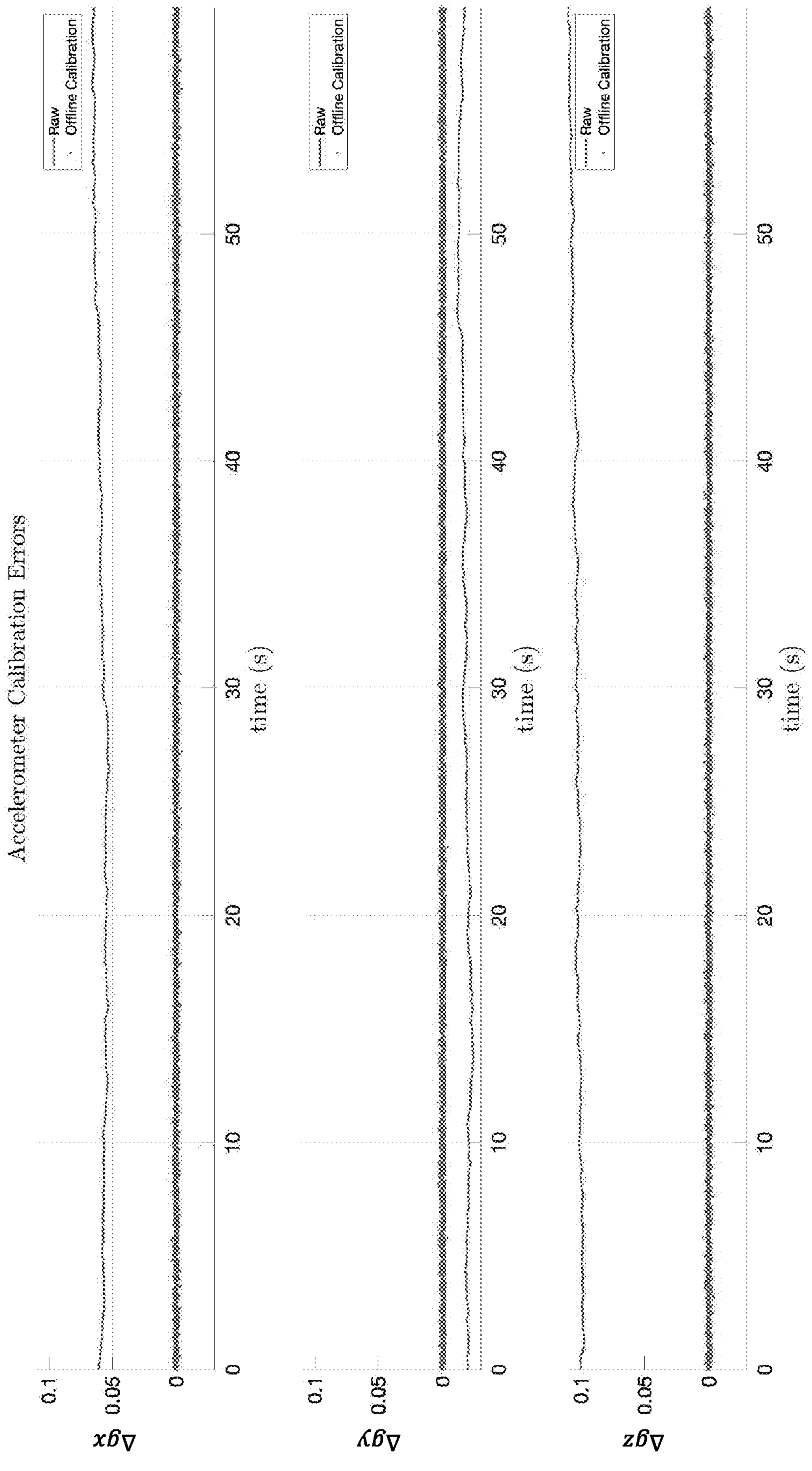
FIG. 6 is a chart showing an evaluation of offline calibration for IMU accelerometer bias errors.

Sensor fusion 526 data is transmitted to AI algorithm modules 528 that are used for training an AI/ML model systematically to react to inconsistency in the calibration to enable faster recovery from erroneous calibration parameter estimates using some of the techniques described above. A suboptimal online calibration may be used to provide time-sensitive situational awareness but does an offline correction to provide a more accurate inference at an acceptable later time with relaxed time and compute-power constraints. As shown in FIGS. 5 and 6, the offline calibration demonstrates that by incorporating the entire history of IMU samples, all accelerometer errors are close to zero. That is in contrast to FIG. 3, where the online calibration errors are minimized only after a complete set of calibration measurements have been captured.

Gravity Removal

The quaternion 532 and calibrated acceleration 530 describing IMU orientation from the sensor fusion algorithm is used to determine acceleration due to gravity that is projected onto the x, y & z axes of the IMU. The gravitational projection is removed 534 from the accelerometer readings to provide linear acceleration estimates 536 in real world coordinates.

Figure 7:
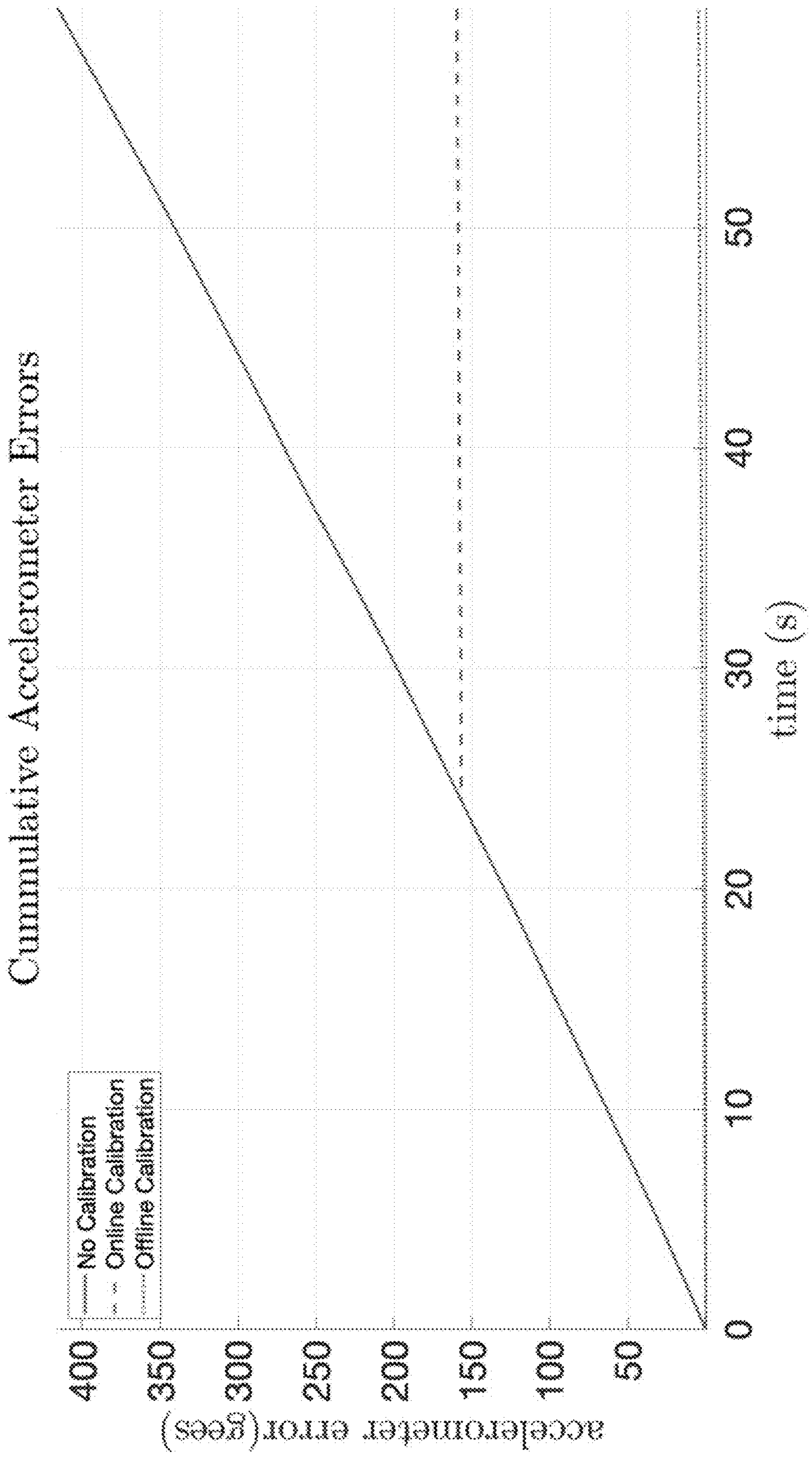
FIG. 7 is a chart showing cumulative accelerometer errors over time for raw IMU signals vs. calibrated IMU signals.

As shown in FIG. 7, the benefit of offline and online calibration is realized in comparison to the scenario of no calibration by evaluating cumulative accelerometer error. For online calibration, errors accumulate over time at a significant rate until the calibration goes into effect at 24 seconds. At that point, the error contribution is significantly reduced. In the offline case, since both historical and future data knowledge is available, the bias and sensitivity errors are minimized over the entire data set. The substantial error contributed by the raw IMU signals will continue to accumulate at a rate that is not tolerable for maintaining accurate IMU orientation.

Figure 8:
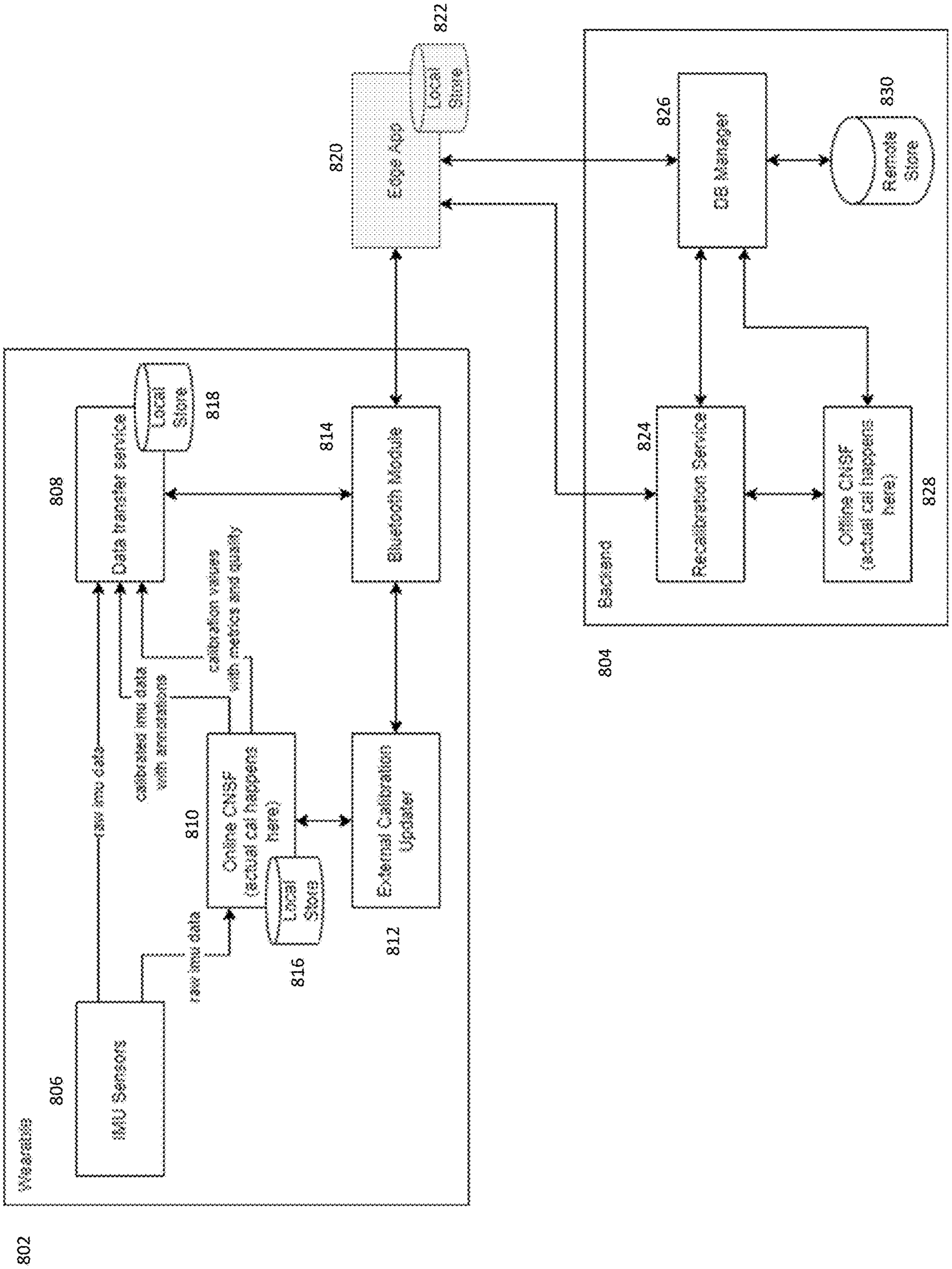
FIG. 8 is a diagram showing how the system of the present invention operates with regard to a wearable device.

FIG. 8 is a diagram showing how the system of the present invention operates with regard to a wearable device in an online-offline hybrid implementation, in accordance with an exemplary embodiment of the invention. As shown in FIG. 8, the system is comprised of a wearable 802 and a backend 804. In certain embodiments, the wearable 802 is the peripheral device 110 shown in FIG. 1, while the backend 140 may be one or computers 120, as shown in FIG. 1. In certain embodiments, the backend 140 may also be a smartphone or tablet. The wearable 110 is comprised of one or more IMU Sensors 806, a Data Transfer Service 808, an Online Calibration and Sensor Fusion ("CNSF") 810, an External Calibration Updater 812, and a Bluetooth Module 814. Each of the Data Transfer Service 808 and the Online CNSF 810 have their own Local Store 816, 818.

In operation, the IMU Sensors 806 collect various sensor data and transmit that raw IMU data to the Online CNSF 810 and the Data Transfer Service 808. The Online CNSF 810 is primarily responsible for performing calculations and coverts the raw IMU data to calibrated IMU data with annotations, while also calculating calibration values with metrics and quality. Recalibration of the raw IMU data is necessitated by such factors as a change in temperature, mechanical shock and/or time. Other reasons for recalibration will be readily apparent to one of ordinary skill in the art. The Online CNSF 810 stores the calibrated IMU data with annotations and calibration values at a Local Store. The Online CNSF 810 then transmits the calibrated IMU data with annotations and calibration values to the Data Transfer Service 808. The Data Transfer Service 808 stores the calibrated IMU data with annotations, the calibration values, and raw IMU data at a Local Store 818. The Online CNSF 810 is also connected to the External Calibration Updater 812, which provides real-time external calibration data to the Online CNSF 810. That external calibration data can be used by the Online CNSF 810 to calculate the calibrated IMU data and the calibration values with metrics and quality.

The Data Transfer Service 808 and the External Calibration Updater 812 are each connected to the Bluetooth Module 814. The Data Transfer Service 808 and External Calibration Updater 812 transmit one or more of raw IMU data, calibration data, calibrated IMU data with annotations, and calibration values with metrics and quality to and from the Bluetooth Module 814. The Bluetooth Module 814 is capable of communicating with the Edge App 820, an application that connects the wearable 110 to the backend 140. The wearable 802 and the backend 804 are in continuous two-way communication through the Edge App 820.

The backend 804 is comprised of a Recalibration Service 824, a DB Manager 826, an Offline CNSF 828, and a Remote Store 830. The Offline CNSF 828 receives the calibration data from the Edge App and compares it against calibration data that is received from the DB Manager 826, which queries the Remote Store 830 for historical, previously calculated data received from the wearable 802. If the calibration data received from the wearable 802 is determined to be less accurate than the historical data, then the Offline CNSF 828 signals the Recalibration Service 824 to request that the External Calibration Updater 812 perform an updated calibration and analysis of the IMU data at the wearable 802. That request for recalibration is transmitted through the Edge App 820 and the Bluetooth Module 814, to the External Calibration Updater 812.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention. All references cited herein are incorporated by reference.

The invention claimed is:

1. A computer-implemented method for dynamic sensor calibration, the method comprising:

receiving initial IMU data from an inertial measurement unit (IMU) of a wearable health monitoring device having one or more physiological sensors outputting physiological sensor data, the initial IMU data comprising raw accelerometer data, raw gyroscope data, and raw magnetometer data;

performing sensor calibration using the initial IMU data to calculate a plurality of initial IMU calibration parameters;

using the plurality of initial IMU calibration parameters, by a sensor fusion module, to calculate an initial estimated orientation of the wearable health monitoring device;

using the initial estimated orientation, by a gravity removal module, to calculate initial linear acceleration data indicative of the past linear acceleration of the wearable health monitoring device;

using the past linear acceleration of the wearable health monitoring device to remove motion artifacts from the physiological sensor data output by the wearable health monitoring device;

storing the initial IMU calibration parameters and the past linear acceleration of the wearable health monitoring device;

receiving updated IMU data from the IMU of the wearable health monitoring device;

using the updated IMU data to calculate updated IMU calibration parameters; and using the updated IMU calibration parameters to back-calibrate linear acceleration data indicative of the past linear acceleration of the wearable health monitoring device.

2. The method of claim 1, wherein there are up to thirty-six IMU calibration parameters.

3. The method of claim 1, further comprising:

comparing a plurality of previously calculated calibration parameters from the inertial measurement unit to the plurality of calibration parameters; and updating the plurality of calibration parameters at an external calibration updater located at a wearable device prior to their transmittal to the sensor fusion module.

4. The method of claim 1, wherein the sensor fusion module is used to determine acceleration due to gravity that is projected onto x, y, and z axes.

5. The method of claim 1, wherein historical calibration data is used to update bias and sensitivity parameters.

6. The method of claim 1, further comprising transmitting the corrected linear acceleration data to a Bluetooth Module for delivery to a second computer.

7. A non-transitory computer storage medium that stores a program thereon that causes a computer to execute a process comprising:

receiving initial IMU data from an inertial measurement unit (IMU) of a wearable health monitoring device having one or more physiological sensors outputting physiological sensor data, the initial IMU data comprising raw accelerometer data, raw gyroscope data, and raw magnetometer data;

performing sensor calibration using the initial IMU data to calculate a plurality of initial IMU calibration parameters;

using the plurality of initial IMU calibration parameters, by a sensor fusion module, to calculate an initial estimated orientation of the wearable health monitoring device;

using the initial estimated orientation, by a gravity removal module, to calculate initial linear acceleration data indicative of the past linear acceleration of the wearable health monitoring device;

using the past linear acceleration of the wearable health monitoring device to remove motion artifacts from the physiological sensor data output by the wearable health monitoring device;

storing the initial IMU calibration parameters and the past linear acceleration of the wearable health monitoring device;

receiving updated IMU data from the IMU of the wearable health monitoring device;

using the updated IMU data to calculate updated IMU calibration parameters; and using the updated IMU calibration parameters to back-calibrate linear acceleration data indicative of the past linear acceleration of the wearable health monitoring device.

8. The non-transitory computer medium of claim 7, wherein there are up to thirty-six IMU calibration parameters.

9. The non-transitory computer medium of claim 7, wherein the program further causes the computer to execute a process comprising:

comparing a plurality of previously calculated calibration parameters from the inertial measurement unit to the plurality of calibration parameters; and updating the plurality of calibration parameters at an external calibration updater located at a wearable device prior to their transmittal to the sensor fusion module.

10. The non-transitory computer medium of claim 7, wherein the sensor fusion module is used to determine acceleration due to gravity that is projected onto x, y, and z axes.

11. The non-transitory computer medium of claim 7, wherein historical calibration data is used to update bias and sensitivity parameters.

12. The non-transitory computer medium of claim 7, wherein the corrected linear acceleration data is transmitted to a Bluetooth Module for delivery to a second computer.

* * * * *